United States Patent [19]
Archer

[11] 4,158,702
[45] Jun. 19, 1979

[54] GAS CLEANSING MEANS

[75] Inventor: William E. Archer, Huntington Beach, Calif.

[73] Assignee: Joy Manufacturing Company, Pittsburgh, Pa.

[21] Appl. No.: 712,625

[22] Filed: Aug. 9, 1976

Related U.S. Application Data

[63] Continuation of Ser. No. 490,807, Jul. 22, 1974, abandoned, which is a continuation-in-part of Ser. No. 243,618, Apr. 13, 1972, abandoned.

[51] Int. Cl.² ............................................. B01D 53/34
[52] U.S. Cl. ................................. 423/210; 423/215.5; 423/242; 55/68; 55/73; 261/36 R; 261/115; 261/118
[58] Field of Search ...................... 423/210, 225.1, 242, 423/243, 215.5, 234, 392; 55/68, 73, 93, 94; 261/115, 117, 118, 36 R

[56] References Cited

U.S. PATENT DOCUMENTS

| | | | |
|---|---|---|---|
| 1,588,833 | 6/1926 | Hogan et al. | 261/118 |
| 1,897,725 | 2/1933 | Gaus et al. | 423/420 |
| 2,098,953 | 11/1937 | Christensen | 423/392 |
| 3,616,597 | 11/1971 | Stewart | 423/210 X |
| 3,819,813 | 6/1974 | Jones, Jr. et al. | 261/118 |
| 3,873,673 | 3/1975 | Teague et al. | 423/243 |
| 3,948,608 | 4/1976 | Weir, Jr. | 423/242 X |

Primary Examiner—Earl C. Thomas
Attorney, Agent, or Firm—Michael R. Swartz

[57] ABSTRACT

Method and apparatus for treating gases by passing said gases horizontally through a plurality of spray zones wherein the gases are contacted in each spray zone with scrubbing medium in a plurality of vertically disposed bays; utilizing a scrubbing medium of varied concentration or chemical reactivity between the adjacent spray zones and bays; combining and reamalgamating the spray medium and re-spraying said amalgamated medium in one or more spray zones and bays.

1 Claim, 4 Drawing Figures

GAS CLEANSING MEANS

This is a continuation, of application Ser. No. 490,807 filed July 22, 1974, and now abandoned, which in turn is a continuation-in-part of application Ser. No. 243,618, filed Apr. 13, 1972 now abandoned.

In the art of gas cleansing it is well known to provide wet scrubbing apparatus or wet electrostatic precipitating apparatus for the purpose of purging a pollutant laden gas stream of entrained gaseous or particulate pollutants before discharging such a stream to the atmosphere. For example, users of large quantities of coal have commonly employed well known wet scrubbing apparatus adapted to chemically purge coal combustion gases of entrained gaseous sulfur dioxide and additionally to physically arrest particulate impurities such as fly ash. Likewise, wet electrostatic precipitating apparatus has been employed in the art to purge such pollutants as fly ash or liquid droplets from a polluted gas stream.

Although heretofore known wet scrubbing and wet precipitating devices generally have served the purposes intended, they have nonetheless been subject to certain undesirable deficiencies. For example, although known wet electrostatic precipitators have been successfully employed to purge particulate impurities, they generally have not been adaptable for the removal of gaseous pollutants from gas streams: thus the utility of such precipitators have been limited. Additionally, known precipitators have often been susceptible to overloading by large quantities of particulate matter. By way of further example, it is noted that some prior wet scrubbers have required very large and powerful fans to force polluted gases at relatively high velocity through relatively restricted flow passages within the scrubber. Not only is the use of such fans unnecessarily wasteful of energy, but the resultant high velocity gas flow through the scrubber has in some cases complicated gas cleansing operations.

The cited deficiencies of prior gas cleansing apparatus are nullified by the present invention which provides a combined and substantially unitary wet scrubbing and wet electrostatic precipitating apparatus having substantially open and unobstructed gas flow passages for the passing of a pollutant laden gas stream therethrough at a relatively low flow velocity. The present invention additionally includes means for contacting such a gas stream with sprays of liquid or slurried scrubbing medium in a plurality of spray zones spaced along the gas flow path within the scrubbing chamber, means to vary scrubbing medium concentration or chemical reactivity between adjacent spray zones, and means to rejuvenate the scrubbing medium by reamalgamation and respraying thereof within one or more spray zones.

These and other objects and advantages of the present invention are more fully specified in the following description and illustrations in which.

Figure 1:
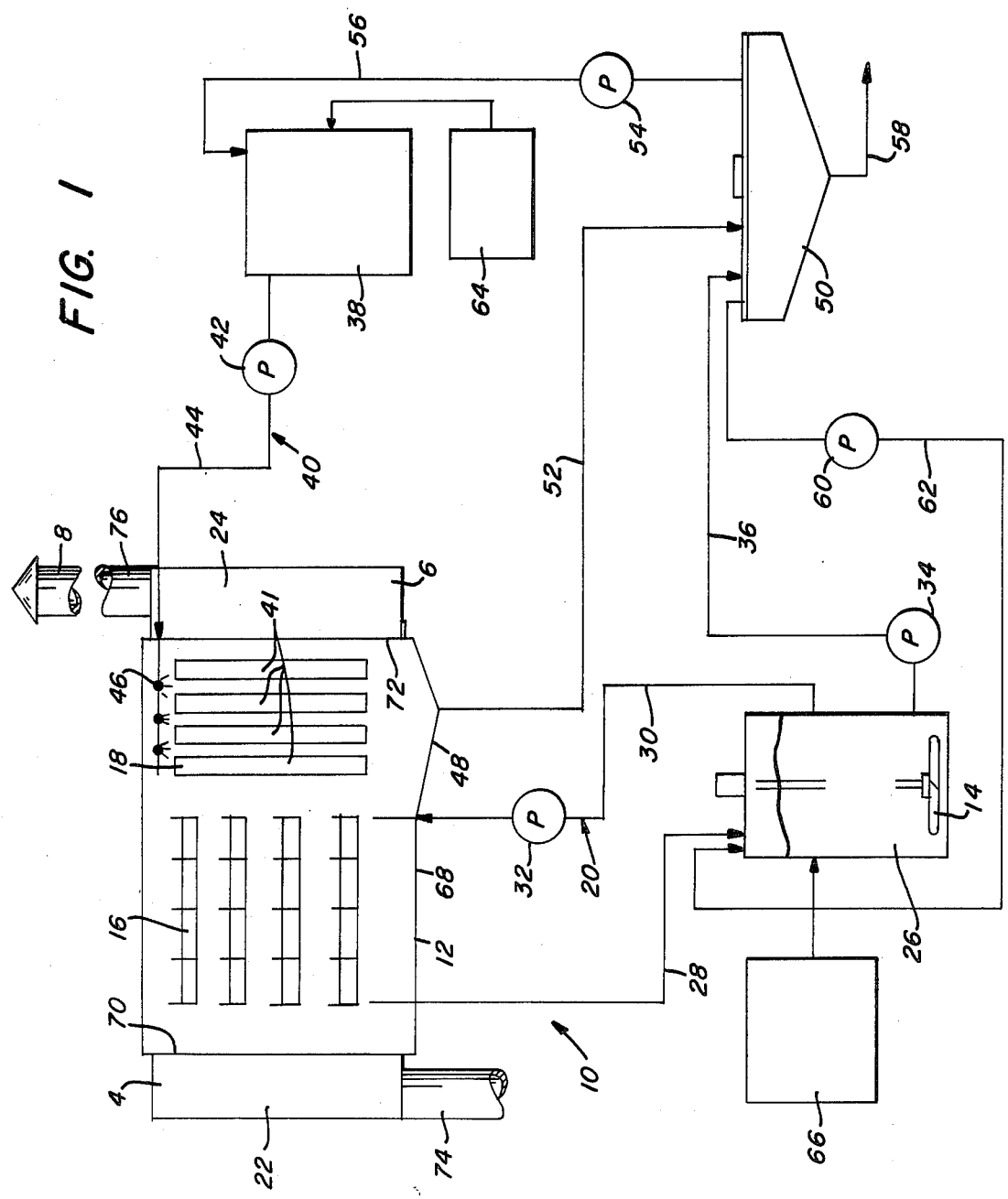
FIG. 1 illustrates in schematic a gas cleansing apparatus constructed in accordance with the principles of the present invention.

There is generally indicated at 10 in FIG. 1 a greatly simplified gas cleansing apparatus constructed in accordance with the principles of the present invention and including a wet scrubbing means 16 and a demister, such as the wet electrostatic precipitating means 18, both of which operate according to well known fundamental principles. Those versed in the art will recognize that the apparatus 10 may in practice be adapted to purge various gaseous, particulate or liquid pollutants, or combinations thereof from a gas stream passed therethrough. However, for purposes of illustrating one embodiment of the present invention the recitation hereinbelow is directed to a simplified gas cleansing apparatus which is adapted to purge both gaseous and particulate pollutants from waste gases such as the flue gas of fossil fuel combustion. Of course it is to be understood from the outset that such simplification is not intended to unduly limit the scope of the invention described.

During combustion of fossil fuels such as coal or oil and particularly during combustion of fossil fuels having a relatively high sulfur content, oxidation of sulfur produces quantities of gaseous sulfur oxides, notably sulfur dioxide, a noxious and objectionable air pollutant the purging of which from flue gases is highly desirable. Fossil fuel combustion may additionally produce other undesirable air pollutants, for example the fly ash generated by burning powdered coal or droplets of sulfur dioxide in aqueous solution suspended in the flue gas stream. Preferably these and all other objectionable pollutants are to be substantially arrested prior to discharging the gas stream to the atmosphere.

Control of such undesirable emissions may be effected by means of the present invention. Accordingly, in the apparatus 10 the scrubber 16 and precipitator 18 are housed within a gas cleansing module 12 having a gas inlet portion 4 and a gas outlet portion 6. Inlet portion 4 communicates with any conventional source of pollutant laden gas such as the flue of a powdered coal burner (not shown), and outlet portion 6 communicates with the atmosphere via a stack 8 whereby in practice a continuous stream of flue gas bearing such pollutant components as mentioned hereinabove is directed via inlet 4 into module 12, through scrubber 16 and precipitator 18 within the module 12, and thence to the atmosphere via outlet 6 and stack 8. Within scrubber 16 the flue gas stream is subjected to the wet scrubbing action of a chemical scrubbing medium for chemical absorption of gaseous sulfur dioxide and physical arrest of particulate contaminants such as fly ash. A suitable scrubbing medium may comprise a slurry of metal carbonate, oxide or hydroxide, for example a lime slurry.

In practice the scrubbing slurry is continuously recirculated within a scrubbing loop generally indicated at 20 which comprises: a hold and classification tank 26 containing the bulk of the scrubbing slurry; a pump 32 which is operable to impel a flow of slurry from tank 26 via a conduit 30 into portion 16; means within portion 16 to be described hereinbelow which are adapted to disperse a flow of slurry within the portion 16; and a conduit 28 communicating between portion 16 and tank 26 to provide a slurry return flow path therebetween.

The scrubbing slurry dispersed within portion 16 contacts the flue gas stream passing therethrough to absorb therefrom a major portion of the entrained gaseous sulfur dioxide and to arrest particulates such as fly ash as indicated hereinabove for subsequent transport thereof via conduit 28 into the tank 26. As is well known the absorbed sulfur dioxide combines with dissolved lime in the slurry to form calcium compounds, predominately calcium sulfite and calcium sulfate, which under opportune conditions will precipitate out of solution to form suspended sulfite and sulfate particles. Thus within the tank 26 there is provided an agitator 14 which is adapted to classify contained particulates such as sulfite and sulfate particles or fly ash into a lower solids concentrated region of tank 26. A pump 34 is provided to selectively impel a flow of such solids concentrated slurry via a conduit 36 into a known solids processing apparatus shown as a thickener 50.

Subsequent to treatment within scrubber 16 the effluent gas stream is directed into precipitator 18 wherein remaining particulate contaminants such as residual fly ash and spurious scrubbing slurry droplets entrained in the gas stream are arrested by electrostatic precipitation prior to release of the gas stream to the atmosphere. The precipitator 18 may be of any well known type such as a hollow pipe or flat plate design wherein particulate contaminants are attracted to collector surfaces by electrostatic forces in the known manner, and are subsequently flushed from collector surfaces by bathing of such surfaces with a suitable wash liquor such as water which is continuously recirculated within a wash loop generally indicated at 40.

The loop 40 includes: a hold tank 38 wherein is contained the bulk of the precipitator wash liquor; a pump 42 adapted to impel a flow of wash liquor from tank 38 via a conduit 44 into the precipitator 18; spray heads 46 shown as being located upwardly adjacent the precipitator 18 which communicate with conduit 44 and are adapted thereby to disperse sprays of wash liquor upon electrodes and collector surfaces of precipitator 18 to flush collected particulates therefrom; a sump portion 48 of module 12 located subjacent precipitator 18 and adapted thereby to collect therein the used wash liquor which falls from bathed surfaces of precipitator 18; and a conduit 52 which provides a flow path for used liquor from sump 48 to thickener 50. Loop 40 additionally includes a pump 54 which is adapted to impel a flow of relatively clear and solids-free recovered liquid from thickener 50 via a conduit 56 into tank 38 for recirculation thereof as wash liquor through precipitator 18 in the manner hereinabove described.

Inasmuch as the structure and operation of the thickener 50 is conventional in every respect, detailed description thereof is omitted herefrom. Suffice it to note in this regard that within thickener 50 the spent slurry and liquor delivered thereinto via respective conduits 36 and 52 are classified in the conventional manner into a waste solids concentrated lower region from which solids may be drawn as indicated at 58 for further processing or disposal thereof, and a relatively solids-free upper region wherein is contained a volume of relatively clear liquid which is suitable for recycling into tank 38 via the conduit 56 as hereinabove described or in a similar manner into the tank 26 via a conduit 62 and a pump 60. Thus the thickener 50 functions as a common solids processing unit for spent media from both the scrubber loop 20 and the precipitator wash loop 40, and further functions as a source of recyclable liquid for both of the loops 20 and 40, thereby significantly increasing system efficiency by eliminating excess or redundant solids processing capacity from the apparatus 10.

It will be evident to those versed in the art that apparatus 10 must of necessity additionally include a suitable source of makeup water such as indicated at 64 to replace system losses due to leakage, evaporation and spills, and a suitable source of reagent such as indicated at 66 to inject fresh lime as necessary for rejuvenation of spent scrubbing slurry.

Figure 2:
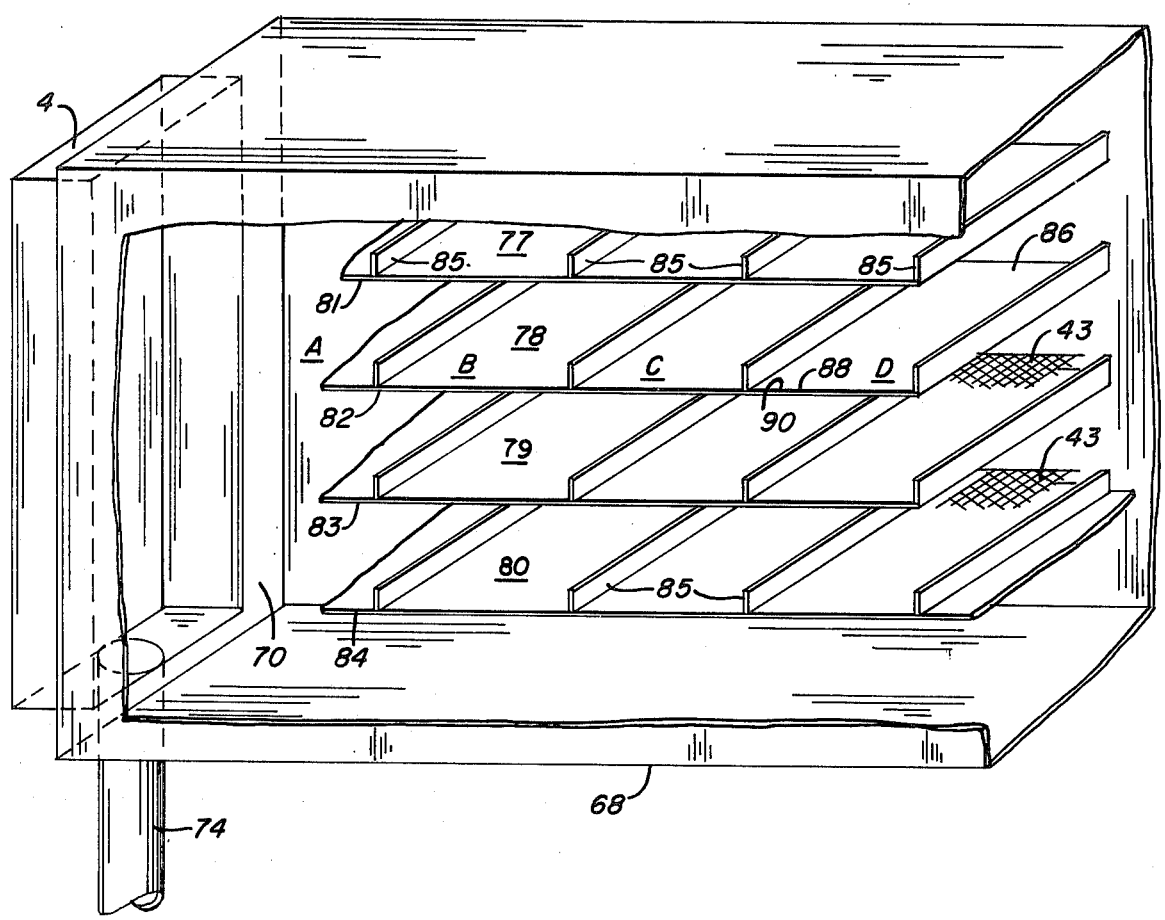
FIG. 2 is a partly cut away trimetric projection of the scrubber portion of the present invention.

Regarding the structural and operational arrangement of the module 12, it will be seen by reference to FIGS. 1 and 2 that the module 12 comprises a closed, generally rectangular vessel 68 which has the respective inlet and outlet portions 4 and 6 communicating with the inner confines thereof adjacent respective longitudinally opposed vessel end walls 70 and 72. The inlet 4 includes an inlet flue 22 shown as a rectangular form which communicates with the inner confines of vessel 68 over substantially the entire area of the respective end wall 70 (FIG. 2) and which further communicates with the dirty gas source (not shown) via a duct 74. In an entirely similar manner the outlet 6 communicates with the inner confines of vessel 68 via an outlet flue 24 adjacent the end wall 72 and further communicates with stack 8 via a duct 76 whereby there is established a substantially horizontal gas flow path within vessel 68 extending longitudinally intermediate the inlet 4 and the outlet 6 and additionally extending transversely of the direction of gas flow over substantially the entire cross sectional area of the vessel 68.

Within vessel 68 the scrubber 16 occupies an upstream portion of the gas flow path, being disposed adjacent inlet 4, and precipitator 18 occupies a downstream portion of the gas flow path, being disposed longitudinally intermediate scrubber 16 and outlet 6. Both scrubber 16 and precipitator 18 occupy substantially the entire cross sectional area of the vessel 68 whereby each is effective to treat gas flowing in any and all cross sectional portions of the gas flow path.

Precipitator 18 may be of any conventional type such as the types hereinabove suggested, the particular design thereof being limited only by applicable operating requirements and by the requirement that the precipitator 18 be adapted to provide substantially unobstructed gas flow intermediate scrubber 16 and outlet 6 throughout the entire cross sectional area of the vessel 68. Such unobstructed flow through precipitator 18 may be provided in any of various ways, for example by employing a flat plate precipitator 18 having a plurality of banks 41 (FIG. 1) of laterally spaced vertically extending collector plates which are oriented such that the flat collecting surfaces of each plate are aligned to the direction of gas flow so as to face laterally opposed sides of vessel 68 whereby free flow of gas intermediate laterally adjacent plates is possible. Those versed in the art will recognize that various other precipitator designs are equally well suited for providing the required unobstructed gas flow therethrough.

Figure 3:
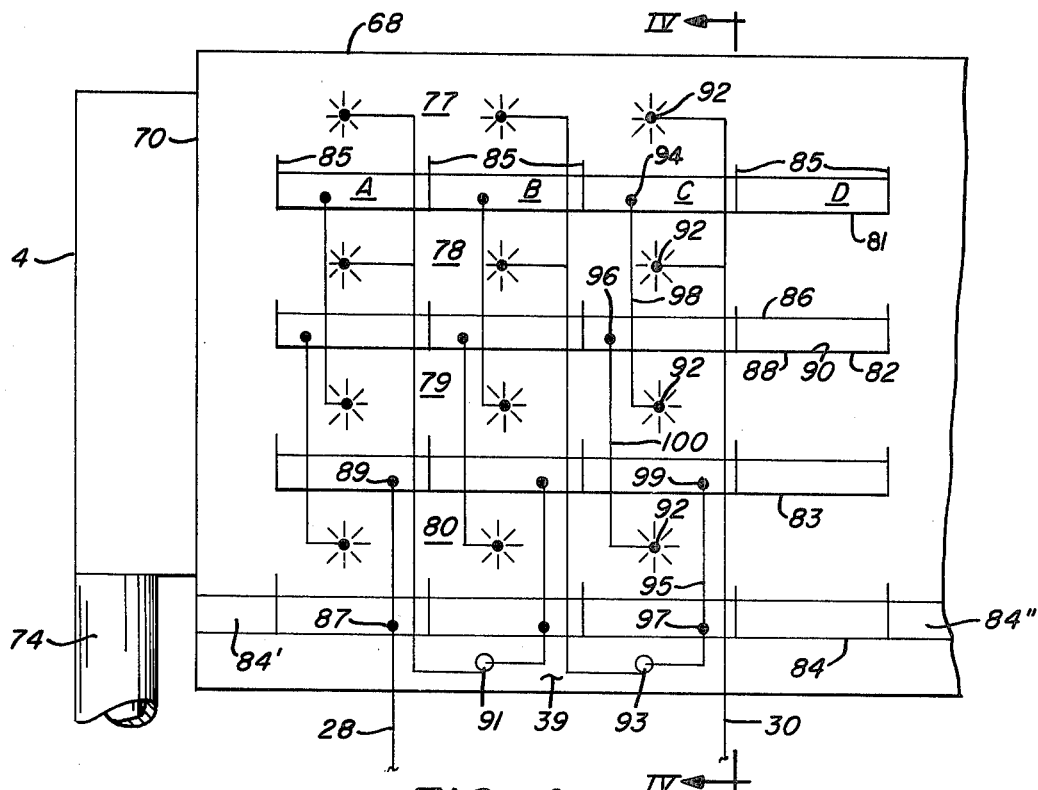
FIG. 3 is an enlarged fragmentary portion of FIG. 1 illustrating in schematic the wet scrubber portion of the present invention.
Figure 4:
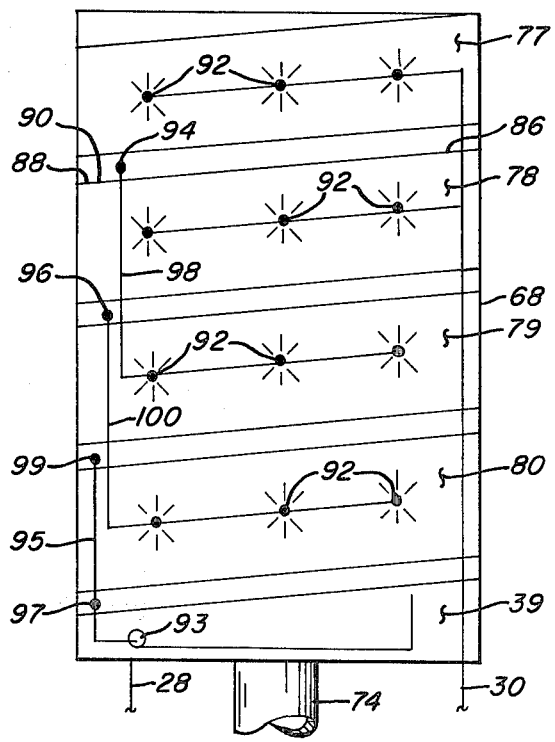
FIG. 4 illustrates in schematic the wet scrubber portion of FIG. 3 substantially as seen from line 4—4 of FIG. 3.

As shown in FIGS. 2 through 4 the scrubber 16 comprises a plurality of vertically stacked, generally horizontally extending chambers 77 through 80 numbered from top to bottom as viewed in FIGS. 2 and 3. The chambers 77 through 80 are bounded laterally by respective opposed side walls of vessel 68 and vertically by a respective plurality of flat, rigid plates 81 through 84 which are vertically spaced such that each plate 81 through 84 underlies one of respective chambers 77 through 80. Each plate 81-84 extends longitudinally to the full length of the scrubber 16 and transversely intermediate opposed side walls of the vessel 68, sloping transversely from an upper plate portion 86 (FIG. 4) located adjacent one vessel side wall to a lower plate portion 88 located adjacent the opposite vessel side wall at an elevation below that of the respective portion 86. The plates 81–84 are rigidly affixed in the positions described by any suitable means such as welding to the vessel 68 side walls.

Each of the plates 81–84 has rigidly affixed adjacent the upper surface thereof and extending vertically upwardly therefrom a plurality of transversely extending, longitudinally spaced partitions or dams 85 which subdivide the respective plate 81–84 into a plurality of longitudinally adjacent bays indicated in FIGS. 2 and 3 from left to right by capital letters A through D. For simplified description hereinbelow, specific bays will be designated by the number of the subject plate and the letter of the subject bay. For example the lower right bay in FIG. 3 will be designated bay 84D. Additionally, the designation for each bay shall be understood to include the overlying portion of the respective chamber 77–80.

The dams 85 are advantageously small in vertical extent relative to the vertical extent of chambers 77–80 to provide within the chambers 77–80 a substantially unobstructed horizontal gas flow path therethrough. Thus it will be seen by reference to description presented hereinabove that within all portions of the module 12 including inlet flue 22, scrubber 16, precipitator 18 and outlet flue 24, the cross sectional area of the gas flow path is relatively large and unobstructed whereby it is feasible to direct an unobstructed flow of gas therethrough for cleansing thereof at very low flow velocities of, for example 5 to 15 feet per second through scrubber 15 and 5 to 25 feet per second through precipitator 18, using only the natural pressure of the gas source. In this manner the need for large fans or like devices to impel the gas stream through the cleansing apparatus 10 is obviated. Additionally, lower flow velocities permit more thorough cleansing of the gas stream and greater control of the cleansing process.

The respective upper and lower side portions 88 and 86 of plates 81–84 define respective upper and lower end portions of the bays 81A–84D whereby there is formed adjacent the lower end portion of each bay 81A–84D a sump portion 90 (FIG. 4) which is adapted to collect and contain therewithin scrubbing medium which has been dispersed within the overlying portion of respective chamber 77–80 in the following manner.

Within each of bays 81A, B, C, through 84A, B, C there is disposed one or more spray heads 94 for dispersing therewithin scrubbing slurry for the purpose of purging pollutants from the flue gases being passed horizontally through chambers 77–80. The scrubbing slurry is initially supplied to heads 92 of bays 81C and 82C (FIG. 3) via the conduit 30 from tank 36 as hereinabove described for controlled dispersion thereof within bays 81C and 82C whereby the dispersed slurry contacts the flue gas passing therethrough to purge fly ash and gaseous sulfur dioxide therefrom. The dispersed slurry thence falls onto the respective portions of plates 81 and 82 underlying bays 81C and 82C and collects within respective sump portions 90 thereof. Outlet connections 94 and 96 in the respective sumps 90 of bays 81C and 82C receive the collected slurry and by way of respective connecting conduits 98 and 100 and other spray heads 92, supply the slurry from sumps 90 of bays 81C and 82C to respective bays 83C and 84C for dispersion therewithin by means of gravity flow. Sumps 90 of bays 83C and 84C collect slurry in a like manner as described hereinabove and other outlets 99 and 97 respectively deliver the collected slurry via a conduit 95 to a pump 93 which is shown in FIG. 3 as being located in an operating space 39 subjacent plate 84 and suitably isolated from the gas flow channels as by extensions 84' and 84" of plate 84. The pump 93 directs the flow of slurry thus received to spray heads 92 in bays 81B and 82B for dispersion therewithin and for subsequent collection and redispersion in bays 83B and 84B as hereinabove described for the bays C. In an entirely similar manner yet another pump 91 directs a flow of slurry from bays 83B and 84B to bays 81A and 82A for dispersion therewithin, and for collection and redispersion within bays 83A and 84A in substantially the manner as hereinabove described. The sumps 90 of bays 83A and 84A are connected by means of respective outlets 89 and 87 to conduit 28 for return of used slurry to the tank 26.

Although no spray heads or outlet connections are shown in the bays 81D–84D, it is to be noted that such may be provided therein to disperse scrubbing slurry as hereinabove described for the bays A, B and C. However, as shown, the bays 81D–84D provide a gas flow path portion upstream of precipitator 18 wherein such contaminants as heavy spurious slurry droplets entrained in the flowing gas or heavy wetted fly ash particles may settle out of the flowing gases prior to electrostatic precipitating operations. Such natural settling of heavy particulates is considered desirable to the extent that it reduces required precipitator capacity.

It is to be noted that by virtue of the scrubber structure described hereinabove fresh slurry from tank 26 is provided for the sprays 92 of bays C inasmuch as these bays represent the farthest downstream scrubbing chamber of scrubber 16 where the lowest sulfur dioxide concentration is encountered. The freshest and most concentrated slurry is thus required to purge as much as possible of this residual sulfur dioxide. Accordingly, the slurry used for scrubbing in bays B is slightly less reactive than fresh slurry, it having previously absorbed residual sulfur dioxide during scrubbing in bays C. Likewise, the slurry used in bays A is somewhat less reactive than fresh slurry, it having previously absorbed sulfur dioxide during scrubbing in bays B and C. Therefore, it will be seen that by virtue of the scrubber arrangement defined hereinabove means are provided to vary slurry reactivity between adjacent bays A, B and C to improve scrubber efficiency.

Moreover it is to be noted that in each set of bays A, B and C the collecting sumps 90 and respective cooperable outlets and spray heads provide means for collecting, mixing and redispersing slurry whereby the scrubbing slurry is rendered more reactive than slurry not so collected and redispersed. Such collecting and redispersing of slurry minimizes the use of ineffective slurry droplets whose surface portions have absorbed their full complement of sulfur dioxide during initial stages of scrubbing. In order to advantageously implement this feature of the present invention the chambers 77 through 80 are advantageously limited to a relatively small vertical height of, for example 5 feet to limit the total time that free falling slurry droplets are able to contact the gas stream. Thus, the slurry droplets remain effective for sulfur dioxide absorption throughout a relatively short scrubbing interval after which the droplets are collected, reamalgamated and redispersed to create fresh droplets with surface portions of renewed reactivity.

An alternative means of collecting and redispersing slurry is illustrated in FIG. 2 wherein there are shown fragmentary portions of a plurality of horizontally extending, vertically spaced expanses of screen mesh 43 which replace all plates 81–84 and some of the sprays 92 by capturing slurry droplets falling thereupon and releasing individual reamalgamated droplets to fall to a lower screen 43 or into a sump (not shown) as gravity overcomes cohesion between the accumulating slurry droplets and the screen 43. According to this structure, the size of slurry droplets generated could be readily controlled by the mesh size of the screen 43. It will be noted that substitution of screens 43 for plates 81–84 preserves the unobstructed horizontal gas flow capability through chambers 77–80.

By virtue of the invention described hereinabove there is provided a gas cleansing apparatus including substantially unitary wet scrubbing and wet electrostatic precipitating means wherein such wet scrubbing means includes means for treating a gas flow in a plurality of scrubber portions with a liquid or slurried scrubbing medium of variable reactivity or reagent concentration. The scrubber further includes means for collecting, mixing or reamalgamating, and redispersing scrubbing slurry within the scrubber. The present invention further includes scrubber and precipitator structures which permit substantially unobstructed flow of gas therethrough whereby the need for forced gas flow as by fans or like devices is obviated. The present invention still further includes waste processing means adapted to receive spent scrubbing slurry and used precipitator wash liquor for processing of waste solids therefrom and for recycling of recovered liquid to the scrubber and precipitator.

Notwithstanding reference hereinabove to a particular embodiment of the present invention, it is to be understood that this invention may be practiced in various alternative embodiments and with numerous modifications thereto without departing from the broad spirit and scope of the invention. For example: gas flow through the scrubber and precipitator may be directed at an angle to the horizontal, including vertical gas flow; the relationship between the direction of slurry flow and gas flow within scrubbing chambers may be intersecting, opposing or concurrent flows; the thickener 50 may alternatively be any other suitable solid processing apparatus such as, for example, a centrifugal separator; the particular configurations of scrubber 16 and precipitator 18 may be varied within a wide design latitude subject only to the functional characteristics described hereinabove; the entire apparatus 10 may be refined and specialized by inclusion therein of cooperable ancillary subsystems; and the like. These and other embodiments and modifications having been envisioned and anticipated it is requested that this invention be interpreted broadly and limited only by the scope of the claims appended hereto.

What is claimed is:

1. A method of treating a horizontally flowing gas stream containing air pollutants with a scrubbing liquor including a reactant which absorbs at least a portion of said pollutants, comprising the steps of:
   (a) contacting a downstream portion of said gas stream in an upper region of a first zone with a mist which includes a plurality of substantially vertically falling droplets of said scrubbing liquor whereby said droplets absorb a portion of said pollutants;
   (b) collecting said absorbed polluted droplets in a first area within said first zone wherein said polluted droplets are reamalgamated;
   (c) contacting said gas stream in a lower region of said first zone with a mist of droplets formed from said reamalgamated scrubbing liquor whereby said newly formed droplets absorb a portion of said pollutants;
   (d) collecting said absorbed polluted droplets of step c in a second area within said first zone and below said first area wherein said polluted droplets are reamalgamated;
   (e) contacting a portion of said gas stream upstream from said downstream portion in an upper region of a second zone with another mist of droplets formed from said reamalgamated scrubbing liquor from step d whereby said newly formed droplets absorb a portion of said pollutants;
   (f) collecting said absorbed polluted droplets in a first area within said second zone wherein said polluted droplets are reamalgamated;
   (g) contacting said gas stream in a lower region of said second zone with a mist of droplets formed from said reamalgamated scrubbing liquor from step f whereby said droplets absorb a portion of said pollutants;
   (h) collecting said absorbed polluted droplets of step g in a second area within said second zone and below said first area wherein said polluted droplets are reamalgamated; and
   (i) repeating steps e through h with at least one additional said zone disposed upstream from said second zone so as to remove said pollutants from said gas stream under conditions wherein the freshest most reactant scrubbing liquor is applied to the furthest downstream zone of said gas stream having the least amount of pollutants and the least reactant scrubbing liquor being applied to the furthest upstream zone of said gas stream having the greater amount of pollutants.

* * * * *

UNITED STATES PATENT OFFICE
CERTIFICATE OF CORRECTION

PATENT NO. : 4,158,702

DATED : June 19, 1979

INVENTOR(S) : William E. Archer

It is certified that error appears in the above-identified patent and that said Letters Patent are hereby corrected as shown below:

Column 5, line 50, delete "94" insert --92--

Signed and Sealed this

Second Day of October 1979

[SEAL]

Attest:

RUTH C. MASON
*Attesting Officer*

LUTRELLE F. PARKER
*Acting Commissioner of Patents and Trademarks*